United States Patent [19]

Tokuda

[11] Patent Number: 5,119,126
[45] Date of Patent: Jun. 2, 1992

[54] PHOTOGRAPHIC PRINTER

[75] Inventor: Kanji Tokuda, Kanagawa, Japan

[73] Assignee: Fuji Photo Film Co., Ltd., Kanagawa, Japan

[21] Appl. No.: 650,383

[22] Filed: Feb. 4, 1991

[30] Foreign Application Priority Data

Feb. 15, 1990 [JP] Japan .................................. 2-34626

[51] Int. Cl.⁵ .................................................. G03B 27/52
[52] U.S. Cl. ......................................... 355/41; 355/50; 355/77
[58] Field of Search ................................... 255/27-29, 255/40, 41, 50, 77

[56] References Cited

U.S. PATENT DOCUMENTS

| | | | |
|---|---|---|---|
| 4,293,215 | 10/1981 | Rosborough, Jr. et al. | 355/40 |
| 4,637,712 | 1/1987 | Arnold et al. | 355/50 X |
| 4,881,090 | 11/1989 | Signoretto | 355/40 X |
| 5,008,700 | 4/1991 | Okamoto | 355/27 |
| 5,023,656 | 6/1991 | Terashita | 355/41 |

*Primary Examiner*—Richard A. Wintercorn
*Attorney, Agent, or Firm*—Sughrue, Mion, Zinn, Macpeak & Seas

[57] ABSTRACT

When printing a frame of a film immediately after developing the film, a mini-lab photofinisher observes the frame that is positioned in a printing station of a mini-lab type printer-processor, so as to input exposure correction data as needed. While positioning the frame in the printing station, frame number bar codes recorded on the film are read to determine the number of the frame. The determined frame number is printed on the reverse of the print image made from that frame. After printing all the frames, a bill printer prints the frame numbers of the printed frames and the corresponding exposure correction data, along with the photofinishing price. When making extra prints, the necessary number of extra prints is written in the bill slip, so that the photofinisher may finish the extra prints with substantially the same quality as the original print by referring to the exposure correction data printed in the bill slip.

15 Claims, 4 Drawing Sheets

FIG. 3

EXTRA PRINT ORDER TABLE

| PRINT FRAME NUMBER | REQUESTED NUMBER | EXPOSURE CORRECTION DATA |
|---|---|---|
| < 2 > | | 1 1 — — |
| < 3 > | | — — A — |
| < 4 > | | 3 — B — |
| < 5 > | | — — — — |
| < 6 > | | — — A — |
| < 7 > | | — — A — |
| < 8 > | | 3 — B — |
| < 9 > | | — — — — |
| < 10 > | | 1 1 — — |
| < 12 > | | — — A — |
| < 13 > | | 3 — B — |
| < 14 > | | — — — — |
| < 16 > | | — — A — |
| < 17 > | | — — A — |
| < 18 > | | 3 — B — |
| < 19 > | | — — — — |
| < 20 > | | 1 1 — — |
| < 22 > | | — — A — |
| < 23 > | | 3 — B — |
| < 24 > | | — — — — |
| < E > | | 1 — — A |
| < > | | |
| < > | | |
| < > | | |
| < > | | |
| < > | | |
| < > | | |

PRICE TABLE

DATE '90/ 2/15  ORDER NUMBER 0017

| | AMOUNT | UNIT PRICE | SUM |
|---|---|---|---|
| DEVELOPMENT | — | 650 | 650 |
| PRINTING | 21 | 35 | 735 |
| EXCISE | 3% | — | 41 |
| TOTAL | | — | 1426 |

PHOTOGRAPHIC PRINTER

BACKGROUND OF THE INVENTION

The present invention relates to a photographic printer, and in particular to a photographic printer which incorporates a bill printer for printing out a bill including the price of photofinishing, and in which each print is recorded with the frame number of the image recorded on a negative photographic film (referred to hereinafter simply as a negative image) from which that print is made.

Most customers request the photofinisher to make prints at the same time the film is developed. In the developing-printing process, an exposed film is developed, and the negative images recorded on the film are printed onto photographic paper. Thereafter, the film is cut into several pieces, e.g. of six picture frames each, and the film pieces are inserted in a film cover sheath to preserve them. The film pieces in the film cover sheath are returned to the customer along with the prints.

Recently, a printer-processor has been used often for printing, wherein a large area transmittance density (LATD) of each image is measured, and a fundamental print exposure for each of three primary colors is calculated for each image based on the LATD thereof. Although about 70% of the prints made using the respective fundamental print exposures would have proper density and color balance, the remaining 30% would have improper density and color balance, and would have subject failure. Therefore, photofinishers have determined suitable exposure correction values experientially, including yellow, cyan, and magenta color correction values as well as density correction values, for each of those prints that otherwise may have subject failure, and have corrected the fundamental print exposures for those images by the corresponding exposure correction values.

In the meantime, because a single print is made from each picture frame of a film in the above-described developing-printing process, when the customer wishes to have more than one print of the same image, the customer requests an extra print. However, often the extra print is made by a different photofinisher, so that the exposure correction values used for the extra prints may well be different from those used in the original developing-printing process. Even if the same photofinisher determines the exposure correction values, the values will not always be equal to those used for the initial printing. For this reason, a conventional extra print often does not have the same density or color balance as the original print.

The applicant for the present invention has proposed a film sheath printing system in which the respective frame numbers are printed not only onto the rear surface of the prints, but also onto a film sheath so as to be superposed on the respective negative images when the film pieces are inserted in the film sheath. Further, exposure correction data used in printing the images of the respective frames are printed on the film sheath along with the respective frame numbers.

However, such a film sheath printing system is intended for use in a large photofinishing laboratory where a large number of films are spliced to form a roll of long film, and the long film is subjected to developing and printing at a high speed. Therefore, it is necessary for the film sheath printing system to use a specific film splicing device, printer, film cutting-inserting device, and so forth, so that the printer-processor becomes large and complex. For this reason, it is difficult to adopt the above printing system in a small photofinishing laboratory (so-called mini-lab) where prints are made for each roll of photographic film.

SUMMARY OF THE INVENTION

In view of the foregoing, one object of the invention is to provide a printer-processor suitable for use in a mini-lab.

Another object of the invention is to provide a printer-processor wherein frame numbers and exposure correction data are printed together with the price of photofinishing in a bill slip.

To achieve the above and other objects, the present invention provides apparatus for detecting the length of advancement length of a negative film and for reading frame number bar codes recorded on the negative film while positioning a picture frame in a printing station, apparatus for discriminating a frame number of a picture frame set in the printing station based on the detected advanced film length and the frame number bar code, a first printing apparatus for printing the frame number onto a print to identify the picture frame from which the print is made, and a second printing apparatus for printing the frame numbers and exposure correction data for the respective picture frames onto a bill slip using a bill printer.

According to the present invention, the exposure correction data are printed along with the corresponding frame number in a well-known bill slip by means of a bill printer that has been provided in conventional printer-processors to print the price of photofinishing. Moreover, the exposure correction data are printed in a column of an extra print order table which has been used as a remarks column in conventional bill slips. Therefore, it becomes possible to realize a printing system for printing frame numbers and exposure correction data, which has a simple construction and thus may be incorporated suitably in a mini-lab type printer-processor.

BRIEF DESCRIPTION OF THE DRAWINGS

The above and other objects and advantages of the present invention will become more apparent from the following detailed description when read in conjunction with the a drawings, in which:

FIG. 3 is a plan view showing an example of bill slip printed in the printer-processor.

DETAILED DESCRIPTION OF THE PREFERRED EMBODIMENT

Figure 1:
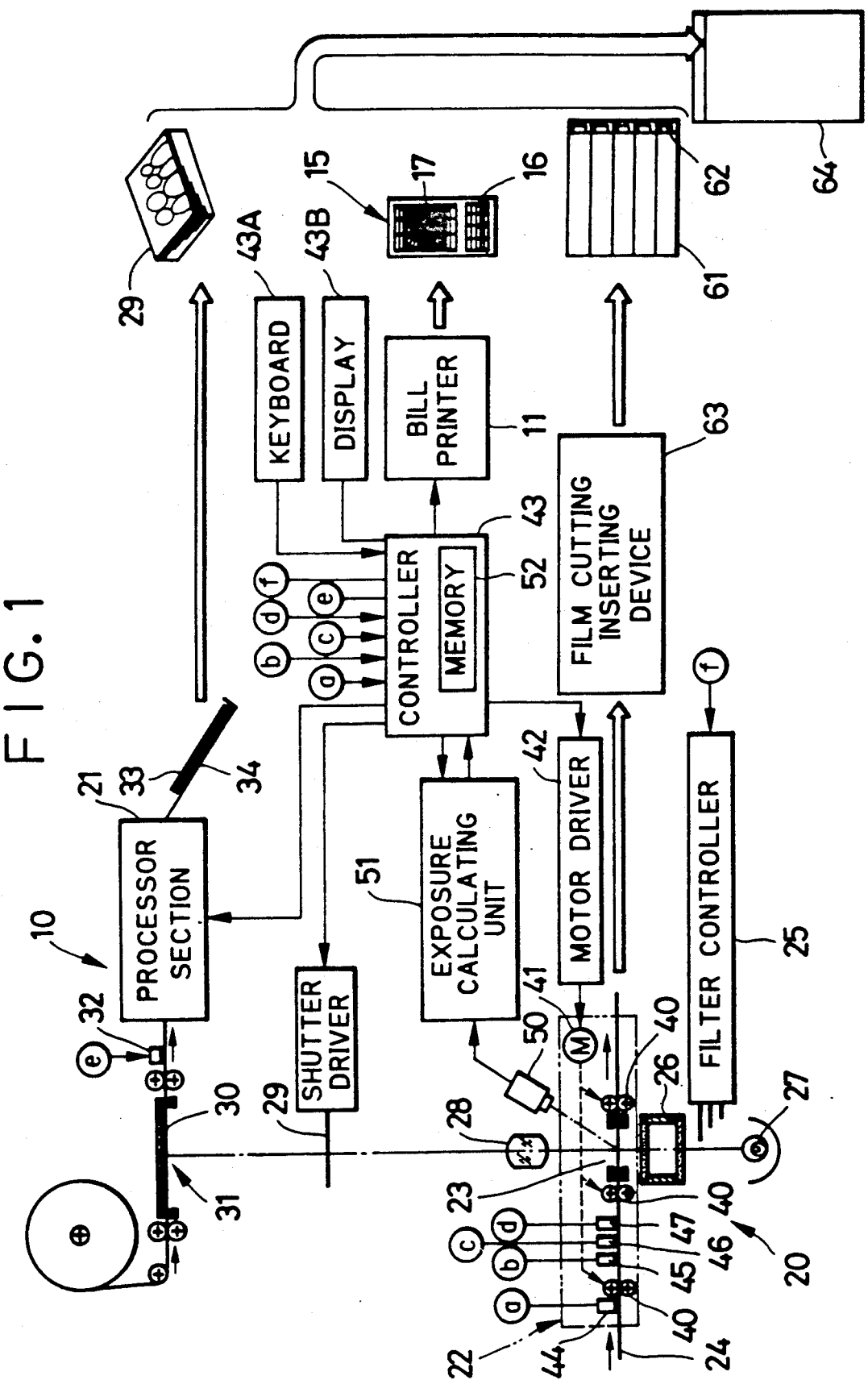
FIG. 1 shows schematically the overall construction of a printer-processor according to one embodiment of the present invention.
Figure 2:
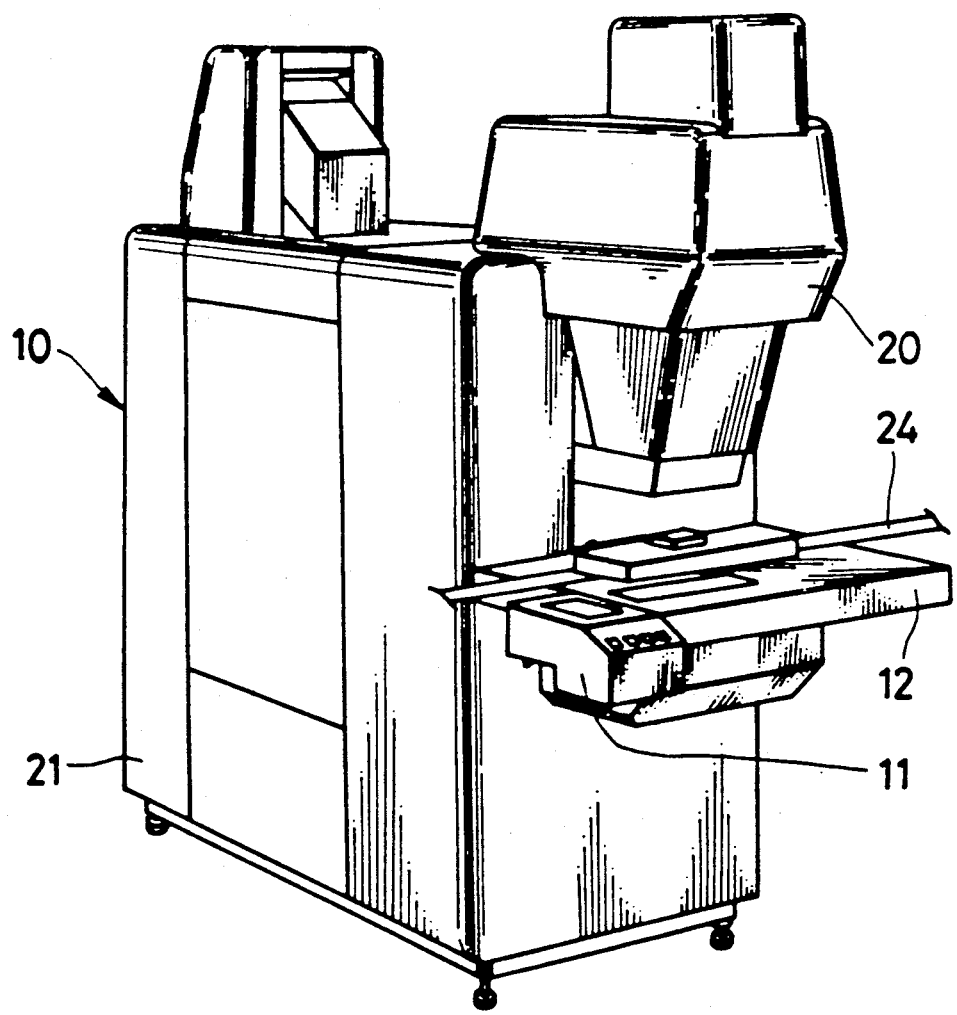
FIG. 2 is a perspective view of the printer-processor.

Referring to FIG. 1, a printer-processor 10 adapted for use in a mini-lab is connected with a bill printer or pricing unit 11 for printing the photofinishing price on a bill slip. The bill printer 11, which may be disposed, for example, on an operating board 12 of the printer-processor 10, as shown in FIG. 2, calculates a price for developing and printing a photographic film based on the number of the finished photographs and, if necessary, an excise on the price, and prints the respective amounts and the total on the bill slip.

An example of a bill slip 15 used in the bill printer 11 is shown in FIG. 3. The bill slip 15 has a price table 16 and an extra print order table 17, as do conventional bill slips. The price table 16 itemizes a development price 16A, a printing price 16B, an excise tax 16C, and a total price 16D. Near the price table 16, the date 16E and the photofinishing serial order number 16F are printed. The extra print order table 17 includes a frame number column 17A and a column 17B for writing the number of extra prints of the requested frame in a conventional manner. The extra print order table 17 further includes a column 17C for writing exposure correction data used for the respective picture frames in the first developing-printing. The space for this column 17C has been used as a remarks column in conventional bill slips. These columns 17A, 17B and 17C are lined into a plurality of ranks, e.g. 28 ranks, each corresponding to a picture frame, so as to enter the respective numbers of requested extra prints in the corresponding ranks of the column 17B. It is possible to use a plurality of bill slips 15 for a film having more than 28 frames such as a 36-frame film or a half-frame film. In such a case, the itemized price is printed in the price table 16 of the last slip.

As described above, according to the present invention, the bill slip 15 includes the exposure correction data column 17C which has been used as a remarks column in conventional bill slips, and exposure correction data are entered in the column 17C by means of the bill printer 11 which also has been adopted in conventional printer-processors.

The overall construction and operation of the printer-processor 10 with the bill printer 11 is as follows. The printer-processor 10 is constituted by a printer section 20 and a processor section 21, as is well known in the art. In the printer section 20, a frame of a negative photographic film 24 is set in a printing station 23 by means of a film carrier 22, and the frame is illuminated by light projected from a light source 27. Color balance of the light is controlled by color filters inserted into the light path by a filter controller 25, and is equalized by travelling through a mixing box 26. To make a print on photographic color paper 30, the light passing through the negative image set in the printing station is focused by a printing lens 28 onto the paper 30 through a shutter 29.

A frame number printer 32 is disposed between a paper exposure station 31 and the processor section 21 for printing frame numbers on the reverse side of the color paper in positions corresponding to the respective printed images. It is preferable also to print the order number of the individual film in addition to the frame numbers so as to facilitate the identification between the prints 33 and the negative film 24. The processor section 21, which includes color developing tanks, bleaching-fixing tanks, super-rinsing tanks, a drier, and so forth, as is well known in the art, subjects the exposed color paper 30 sequentially to these photographic processing portions. The processed color paper 30 is cut into individual prints 33, which are stacked in a tray 34.

The above-mentioned film carrier 22, which is adapted to set the negative film 24 automatically in the printing station 23, has three pairs of feed rollers 40 and a pulse motor 41 for driving the rollers 40 to feed the negative film 24. The pulse motor 41 is controlled by a controller 43 through a driver 42. A film sensor 44, a film leader portion sensor 45, a frame sensor 46 and a frame number bar code sensor 47 are disposed before the entrance to the printing station 23. Output signals from these sensors are sent to the controller 43. The film sensor 44 detects whether the negative film 24 is positioned in the entrance of the first feed roller pair 40. The film leader portion sensor 45 detects the leader portion of the transported negative film 24. The frame sensor 46 detects the margins of each picture frame on the basis of a difference in density between the image and the spacing portion. The frame number bar code sensor 47 reads frame number bar codes registered in the edge area of the negative film 24.

The film carrier 22 further includes a scanner 50, mounted obliquely above the printing station 23, to measure three primary color components of the transmitted light from the negative image in the printing station 23. Signals from the scanner 50 are sent to an exposure calculating unit 51. The exposure calculating unit 51 calculates characteristic values of the negative image such as the LATD and color correction coefficients, and then calculates an exposure control value based on these characteristic values and exposure correction data which are inputted manually as needed, in accordance with a predetermined operation formula. The exposure control value is sent to the controller 43. The exposure correction data is inputted by the operator of the printer-processor through a keyboard 43A including density correction keys, color correction keys, function keys, correction keys, and so forth, when the operator predicts that the image would have subject failure if printed with using a fundamental exposure determined depending on the LATD of that image. Such a prediction is made by experience.

The controller 43 is constituted by a well-known microcomputer and is connected with the keyboard 43A and a display 43B through which various data and instructions are inputted and displayed. The controller 43 controls advancing of the negative film 24, printing-processing, frame number printing, bill printing and other operations in a sequence as set forth below.

Figure 4:
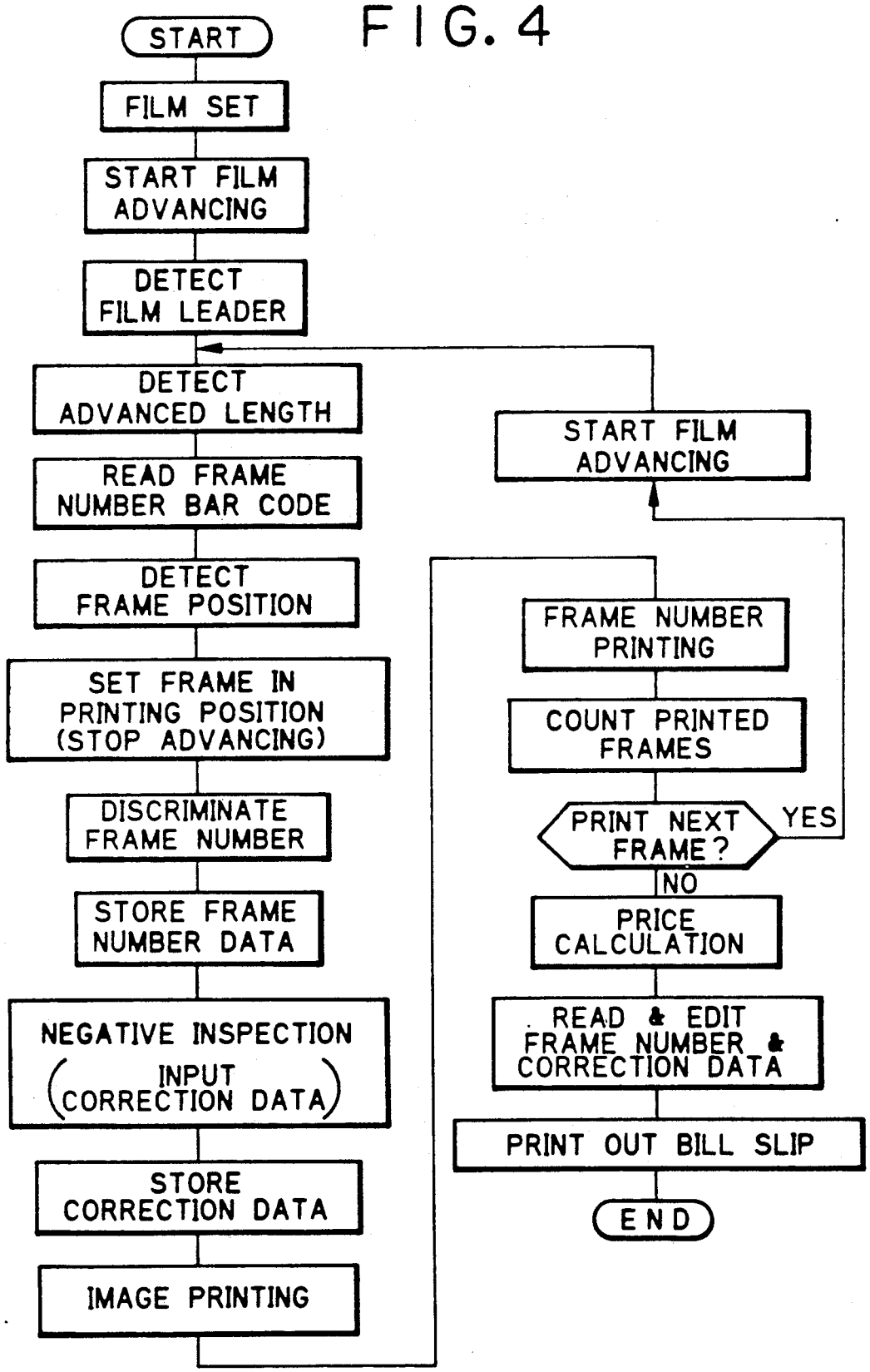
FIG. 4 is a flowchart for explaining the processing procedure in the printer-processor.

As explained in FIG. 4, first the negative film 24 is set in the film carrier 22 with its leader portion nipped between the first feed roller pair 40. Based on a film detection signal from the film sensor 44, the controller 43 determines that the film leader portion is set in this condition, and then drives the pulse motor 41 to rotate the film feed roller pairs 40 to feed the negative film 24 to the printing station 23. During film feeding, the controller 43 counts the number of drive pulses supplied to the pulse motor 41, thereby to measure the length of film advanced from the beginning of the leader portion detection. The controller 43 stops driving the film feed roller pairs 40 when a predetermined length of film is advanced after a leading margin of a frame is detected by the frame sensor 46, thereby positioning the frame in the printing station 23.

The bar code sensor 47 reads the frame number bar code on the negative film 24 passing by the bar code sensor 47 and outputs a bar code signal to the controller 43, which then discriminates a frame number of a picture frame in the printing station on the basis of the bar code signal and the advanced film length detected as above. The above described frame number determination process is disclosed in more detail in U.S. Pat. No. 4,918,484 (corresponding to Japanese Unexamined Patent Publication 01-102539). The frame number data of the respective picture frame are temporarily stored in a predetermined area of a memory 52 built into the controller.

In the meantime, the operator observes each picture frame set in the printing station and, if necessary, operates the keyboard 43A to correct the deviation of the frame position in the printing station by means of a fine control key or input exposure correction data by means of the correction keys. The controller 43 sends the exposure correction data to the exposure calculating unit 51 and, at the same time, stores them in the memory 52 along with the corresponding frame numbers.

The exposure calculating unit 51 calculates the characteristic values of the frame image such as the LATD and color correction coefficients based on a light measurement value detected by the scanner 50, and then calculates an exposure control value based on the characteristic values and the exposure correction data in accordance with well-known operation formulas. The controller 43 receives the exposure control values from the exposure calculating unit 51 to determine a filter position for each color filter according to a well-known filter calibration curve, and to control the filter controller 25 according to the determined filter positions. Simultaneously, the controller controls a shutter driver 53, so that light from the light source 27 is controlled in color balance by the color filters and travels through the image on the negative film 24, and is focused on the surface of the color paper 30 in the paper exposure station 31, thereby printing the image onto the color paper.

Next, the controller 43 advances the color paper 30 by one frame to replace the exposed portion, that is, the print frame, with an unexposed portion of the color paper 30. During advancement of the color paper 30, the frame number printer 32 prints the frame number on the reverse side of the print frame. The controller 43 also advances the negative film 24 by one frame in cooperation with the color paper advancement, thereby positioning the next negative image in the printing station 23.

The just-described process is repeated to print until all the frame images of a negative film have been printed onto the color paper. When the printing process for a negative film is completed, the controller 43 calculates the prices of printing and reads out the frame number data and the exposure correction data stored in the memory 52, so as to edit these data as print data in accordance with the format of making hard copy of these data in the respective tables 16 and 17 of the above described bill slip 15. The print data are sent to the bill printer 11, which then prints the itemized price in the price table 16, the frame numbers 18 and the exposure correction data 19 in the extra print order table 17 of the bill slip 15 in accordance with the print data. In this way, the bill slip 15 as shown in FIG. 3 is written out.

It is to be noted that improperly exposed negative images and those which are out of focus are not printed upon developing and printing, and the frame numbers of such improper images, the first, eleventh, and fifteenth frames for instance, are not printed in the extra print order table 17. If the customer wishes to have a print of such an improper image, it may be possible to write the frame number of that image and the desired number of prints in a blank in the lower portion of the extra print order table 17.

After all the frame images are printed, the negative film 24 is removed from the film carrier 22 and is cut into pieces 61 which contain six frames each. The film pieces 61 are inserted in a film sheath 62. Cutting and insertion of the negative film into the film sheath 62 are performed in a conventional manner by means of a film cutting-inserting device 63, but it also is possible to cut and insert the film manually. The film sheath 62, containing all film pieces of a negative film, is enclosed with the finished prints 33 and the bill slip 15 in an envelope 64, which then is forwarded to the customer.

When ordering extra prints, the customer can see the frame numbers of the needed prints and write the number of extra print of the requested frame in the rank of the column 17B adjacent to the rank of the column 17A in which the frame number of that frame is printed. The customer has only to forward the written bill slip 15 as an extra print order slip, together with the film pieces 61 contained in the film sheath 62, to a photofinisher. It is unnecessary for the customer ordering an extra print to identify the photograph with the negative image from which the photograph is made, so as to determine the frame number.

The photofinisher checks the number of the frame to be printed by the extra print order slip to select the film piece including the designated frame, and subjects the negative image of the designated frame to printing so as to make the requested number of prints thereof, wherein it is possible to finish the extra print so that it has substantially the same density and color balance as the original photograph by using the exposure correction data printed in the extra print order slip, that is, the exposure correction data used in developing and printing of that photograph.

In the above described embodiment, the picture frames are set automatically in the printing station 23 on the basis of the frame detection signal from the frame sensor 46 disposed in the film carrier. However, instead it is possible to set the picture frame in the printing station 23 by advancing the negative film 24 stepwise by a predetermined length each time a film advance key of the keyboard 43A is actuated.

Although in the foregoing embodiment the printing of the bill slip 15 is performed after printing of all frames, it also is possible to print the frame number and exposure correction data of the corresponding picture frame after each print is made, and to effect the pricing and printing of the price in the bill slip 15 after all frames of a film are printed.

Furthermore, in the above embodiment it would appear that only the frame numbers of actually printed frames are printed, but the frame numbers of improper negative images or the like are not printed. However, it is possible to skip over the rank that otherwise would be assigned to each of those frames in printing the frame number and correction data, in order to indicate the unprinted frames more clearly. This embodiment is preferable when the extra print order table 17 is sectioned into groups of six ranks by broader reference lines 17D as in the bill slip of FIG. 3, because it facilitates the finding of the frame to be printed among of six frames of each film piece with reference to the reference lines 17D. It is still more preferable to determine the cut positions of the negative film before the actual cutting, and to print the frame numbers and other data of frames that would belong to the same film piece cut at the previously determined cut position, in the same rank group sectioned by the reference lines 17D. In this way, the frame finding becomes easier for the photofinisher because the frame numbers and the exposure correction data are indicated in the extra print order table in an arrangement corresponding to the actual film pieces.

While the invention has been described in detail above with reference to a preferred embodiment, various modifications within the scope and spirit of the invention will be apparent to people of working skill in this technological field. Thus, the invention should be considered as limited only by the scope of the appended claims.

What is claimed is:

1. A photographic printer for printing picture frames recorded on a photographic film onto photographic paper, said photographic film having frame number bar codes recorded thereon, said photographic printer comprising:
    means for positioning the photographic film in a printing position;
    means for inputting exposure correction data for the respective picture frames;
    means for calculating a photofinishing price based on a number of printed photographs; and
    first printing means for printing a bill slip containing the calculated price of photofinishing;
    means for detecting an amount of advancement of film while positioning each said picture frame in said printing position;
    means for reading said frame number bar codes;
    means for determining a frame number of a picture frame positioned in said printing position based on the detected amount of film advancement and the frame number bar code;
    second printing means for printing the determined frame number onto a print made from said picture frame; and
    means for printing the exposure correction data inputted for a picture frame along with its frame number onto said bill slip using said first printing means.

2. A photographic printer as defined in claim 1, wherein said film advancement amount detecting means includes a film leader portion sensor, a frame margin sensor, and a counter for counting drive pulses supplied to a stepping motor for advancing the film.

3. A photographic printer as defined in claim 1, wherein said frame number bar code reading means is disposed above said printing position.

4. A photographic printer as defined in claim 1, wherein said bill slip includes a price table and an extra print order table having a frame number column and a column for writing a requested number of extra prints, and the exposure correction data are printed in said extra print order table in relation to the frame numbers printed in said frame number column.

5. A photographic printer as defined in claim 4, wherein said bill slip further includes a remarks column, said exposure correction data being printed in said remarks column.

6. A photographic printer as defined in claim 1, wherein said first printing means prints the frame numbers and the corresponding exposure correction data of only those picture frames from which prints are actually made.

7. A photographic printer as defined in claim 1, wherein said photographic film is cut into pieces after printing, and said first printing means prints the frame numbers and the corresponding exposure correction data in an arrangement corresponding to the picture frame arrangement in said pieces.

8. A photographic printer as defined in claim 1, wherein said first printing means prints the exposure correction data and the corresponding frame numbers after printing all of the picture frames of a single photographic film.

9. A photographio printer as deined in claim 1, wherein said first printing means prints the exposure correction data and the corresponding frame number after the printing of each picture frame.

10. A method of printing picture frames recorded on a photographic film and positioned in a printing position onto a photographic paper, the photographic film having frame number bar codes recorded thereon beforehand, wherein exposure correction data of the respective picture frames are inputted, and the price of photofinishing is calculated according to the number of printed photographs, and is printed onto a bill slip by means of a bill printer; said method further comprising the following steps:
    detecting an amount of advancement of film while each picture frame of said photographic film is being positioned in said printing position;
    reading said frame number bar codes;
    determining a frame number of a picture frame positioned in said printing position based on the detected film length advancement amount and the detected frame number bar code;
    printing the frame numbers on the respective prints according to the determined frame number; and
    printing said exposure correction data for the respective picture frames along with the corresponding frame numbers onto said bill slip using said bill printer.

11. A method as defined in claim 10, wherein the frame numbers and the corresponding exposure correction data of only those picture frames from which prints are actually made are printed onto said bill slip.

12. A method as defined in claim 10, further comprising the steps of cutting said photographic film into pieces after printing, and printing the frame numbers and the corresponding exposure correction data onto said bill slip in an arrangement corresponding to the picture frame arrangement in the pieces.

13. A method as defined in claim 12, wherein the exposure correction data and the corresponding frame numbers are printed after all of the picture frames of a single photographic film are printed.

14. A method as defined in claim 12, wherein the exposure correction data and the corresponding frame number are printed after each picture frame is printed.

15. A method as defined in claim 10, further comprising the steps of making extra prints using the exposure correction data of the requested picture frames printed in said bill slip.

* * * * *